United States Patent
El-Hibri

(10) Patent No.: US 7,423,110 B2
(45) Date of Patent: *Sep. 9, 2008

(54) POLYSULFONE COMPOSITIONS EXHIBITING VERY LOW COLOR AND HIGH LIGHT TRANSMITTANCE PROPERTIES AND ARTICLES MADE THEREFROM

(75) Inventor: Mohammad Jamal El-Hibri, Atlanta, GA (US)

(73) Assignee: Solvay Advanced Polymers, L.L.C., Alpharetta, GA (US)

( * ) Notice: Subject to any disclaimer, the term of this patent is extended or adjusted under 35 U.S.C. 154(b) by 404 days.

This patent is subject to a terminal disclaimer.

(21) Appl. No.: 10/511,094

(22) PCT Filed: Apr. 15, 2003

(86) PCT No.: PCT/US03/11501

§ 371 (c)(1), (2), (4) Date: Apr. 11, 2005

(87) PCT Pub. No.: WO03/089519

PCT Pub. Date: Oct. 30, 2003

(65) Prior Publication Data

US 2005/0176923 A1 Aug. 11, 2005

Related U.S. Application Data

(60) Provisional application No. 60/452,961, filed on Mar. 10, 2003, provisional application No. 60/372,078, filed on Apr. 15, 2002.

(51) Int. Cl.
C08G 75/20 (2006.01)
C08G 75/00 (2006.01)
H01L 21/02 (2006.01)

(52) U.S. Cl. .................. 528/391; 528/171; 528/373; 438/31; 438/643

(58) Field of Classification Search ............... 528/171, 528/373, 391; 438/643, 31
See application file for complete search history.

(56) References Cited

U.S. PATENT DOCUMENTS 3,755,256 A 8/1973 Beverly (Continued)

FOREIGN PATENT DOCUMENTS

GB 1398133 * 6/1975

OTHER PUBLICATIONS

Claims of U.S. Appl. No. 10/510,707.*

*Primary Examiner*—Duc Truong
(74) *Attorney, Agent, or Firm*—Oblon, Spivak, McClelland, Maier & Neustadt, P.C.

(57) ABSTRACT

A polysulfone composition is provided having a total luminous light transmittance of 84% or greater when measured on 0.1 inch thick specimens using ASTM D-1003. The specimens also meet at least one of the following two conditions: 1) a yellowness index (YI) of less than about 5.0 as measured according to ASTM D-1925 on 0.1 inch thick specimens, or 2) a color factor (CF) of less than about 25, wherein CF is defined by the following equation: $CF=270[(x+y)_{sample}-(x+y)_{air}]/t$, wherein x and y are chromaticity coordinates measured in transmittance mode and t is sample thickness in inches. Another polysulfone composition is provided comprising a polysulfone, an organic phosphorous-containing melt stabilizer, and at least one of the following additives: a blue to violet dye, and an organic optical brightener. The polysulfone composition of the present invention is used to form transparent molded articles such as ophthalmic lenses.

29 Claims, 6 Drawing Sheets

U.S. PATENT DOCUMENTS

| | | |
|---|---|---|
| 4,108,837 A | 8/1978 | Johnson et al. |
| 4,175,175 A | 11/1979 | Johnson et al. |
| 4,307,222 A | 12/1981 | Schwab et al. |
| 4,409,351 A | 10/1983 | Lee |
| 5,166,305 A | 11/1992 | Park et al. |
| 5,340,480 A | 8/1994 | Kawata et al. |
| 5,438,086 A | 8/1995 | Stevenson et al. |
| 5,511,985 A | 4/1996 | Noschese et al. |
| 6,420,514 B1 | 7/2002 | Hage et al. |
| 2001/0053805 A1 | 12/2001 | Srchibald et al. |
| 2002/0010307 A1 | 1/2002 | Schwab |

* cited by examiner

Yellowness Index/Color Factor Correlation for UDEL® Polysulfone

Dependence of UDEL® P-3703 NT Polysulfone Transmittance on Resin Color Factor in 400-540 nm Wavelength Range UDEL® Polysulfone Visible Light Transmittance versus Wavelength for Various Color Factors Compared with LEXAN® 104 Polycarbonate.

Visible Transmittance Spectra of Low Color Polysulfone with Various Color Stabilization Options.

Dependence of Yellowness Index on Thickness

POLYSULFONE COMPOSITIONS EXHIBITING VERY LOW COLOR AND HIGH LIGHT TRANSMITTANCE PROPERTIES AND ARTICLES MADE THEREFROM

CROSS REFERENCE TO PROVISIONAL APPLICATIONS

This application claims priority from U.S. provisional patent application Ser. No. 60/372,078; filed Apr. 15, 2002; and 60/452,961; filed Mar. 10, 2003, the entire disclosures of which are incorporated herein by reference.

TECHNICAL FIELD

This invention is directed to a polysulfone composition with low yellowness index and high light transmittance and articles made from the polysulfone composition, such as ophthalmic lenses.

BACKGROUND OF THE INVENTION

Sulfone polymers are high performance amorphous thermoplastic engineering resins that contain the characteristic diaryl sulfone linkage. Sulfone polymers are known for their high mechanical strength, thermal and oxidative resistance, resistance to hydrolysis, and to many acids, bases, and solvents.

Polysulfone is a well-known high temperature amorphous engineering thermoplastic resin. It exhibits a high glass transition temperature of about 185° C., high strength, stiffness and toughness over a temperature range from about −100 to 150° C. Being completely amorphous, the polymer also exhibits transparency, which adds to its utility in many end uses. Polysulfone was commercially introduced in 1965 by the Union Carbide Corporation. It has the chemical structure:

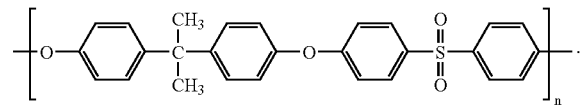

The polysulfone shown above, commonly abbreviated as PSU, is probably the most commercially important member of a broad family of aromatic backbone polymers known as polyarylethers. These polymers can be produced by a variety of methods. For example U.S. Pat. Nos. 4,108,837 and 4,175,175 describe the preparation of polyarylethers and in particular polyarylethersulfones. Several one-step and two-step processes are described in these patents, which patents are incorporated herein by reference in their entireties. In these processes, a double alkali metal salt of a dihydric phenol is reacted with a dihalobenzenoid compound in the presence of sulfone or sulfoxide solvents under substantially anhydrous conditions. In a two-step process, a dihydric phenol is first converted, in situ, in the presence of a sulfone or sulfoxide solvent to the alkali metal salt derivative by reaction with an alkali metal or an alkali metal compound. In the case of PSU manufacture, the starting monomers are bisphenol A and a 4,4'-dihalodiphenylsulfone, typically 4,4'-dichlorodiphenylsulfone. The bisphenol A is first converted to the dialkali metal salt derivative by first reacting with a base like sodium hydroxide, NaOH, in a 1:2 stoichiometric molar ratio to produce the disodium salt of bisphenol A. This disodium salt of bisphenol A is then reacted with 4,4'-dichlorodiphenylsulfone in a second step to produce the polymer. Sodium chloride salt is produced as a byproduct of the polymerization

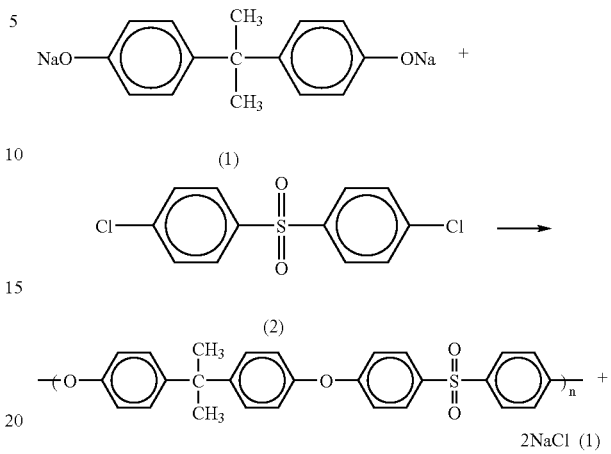

The salt is filtered, then the polymer solution is either contacted with a non-solvent to precipitate the polymer or, alternatively, the polymer is recovered by evaporative removal of the solvent. In either case, the solvent removal is usually followed by forming of the polymer into pellets in an extruder, preferably a twin screw extruder.

Among the many desirable physical characteristics and attributes of PSU, this polymer is transparent in its natural state. The transparency of polysulfone is useful in combination with its high heat and other high performance attributes. Examples of uses where the transparency is useful include covers and lids for hot serving dishes and containers, lids for medical sterilization trays, research lab animal cages, dairy processing equipment, flow meters and sight glasses for chemical process equipment.

The transparency of PSU, coupled with the high refractive index of the material relative to other transparent thermoplastics (1.63 versus 1.59 for polycarbonate), make polysulfone a candidate for use in lens applications as it can allow the design of higher powered lenses for a given lens thickness and weight, or alternatively design thinner and lighter lenses relative to polycarbonate for a given power or diopter rating. The high refractive index allows lens makers to produce high-powered lenses with relatively low curvature (and hence lower mass) relative to what is possible with lower index materials such as glass, polymethylmethacrylate (PMMA) and conventional thermosetting plastics used for this purpose. Because of this feature, polysulfone is therefore particularly attractive for use in ophthalmic lenses for spectacles used in prescription eyewear.

In the ophthalmic lens industry a material is considered 'high index' if its refractive index is 1.60 or higher. As such, polysulfone is poised to become the first thermoplastic resin in the high index category. However, polysulfone's entry into the ophthalmic lens industry, and indeed into most other optical applications, has been hampered by the yellowness that, until now, has been present in all commercially available polysulfone to date. Apart from being aesthetically undesirable, the yellow cast also limits the light transmittance that is critical for a high clarity lens for prescription eyewear. Water white or near water white clarity is a key requirement for any lens material, and, to date, the state of the art of polysulfone manufacture has not yet allowed the production of resin with the type of clarity that is needed. Polysulfone has been of interest to the ophthalmic lens industry for a long time as it offers a number of attractive features. In addition to providing a high refractive index polysulfone offers low cost thermoplastic lens fabrication methods (i.e. hybrid injection-compression molding). In addition to the reduced lens thickness and weight which are desirable to the consumer, the good impact resistance of polysulfone allows thin lenses to be viable.

For an ophthalmic lens material to be viable, it is generally accepted that it must meet the following three optical property requirements:

1. A low yellowness index, as commonly measured by ASTM method D-1925, is needed. Yellowness index is a thickness dependent property. Yellowness index values below 1.0 are generally desirable, but at minimum, the material must have a yellowness index of 2.0 or less at a thickness of 0.1 inch (2.5 mm). Yellowness indices below 2.0 are difficult to discern with the naked eye and may be considered of sufficient quality for optical lens uses in general and ophthalmic lenses in particular.

2. A high light transmittance as commonly measured by ASTM method D-1003 is also a key requirement. Light transmittance values greater than 85% are needed as a minimum. Light transmittance is also a thickness dependent property although generally to a lesser extent than yellowness index. It is commonly measured at a thickness of 0.1 inch (2.5 mm), so that if the transmittance requirements are met at 0.1 inch (2.5 mm) thickness, they will be automatically met at reduced thicknesses.

3. A low haze as measured by ASTM method D-1003 is also a requirement. Haze is the ratio of the diffuse light transmittance to the total light transmittance through a specimen expressed as a percent. It generally needs to be below 2.0% and preferably below 1.0% for 0.1 inch (2.5 mm) for a high clarity or optical quality material. Haze values below 2.0% are difficult to discern by the naked eye and thus are acceptable. Like yellowness index and light transmittance, haze is also dependent on specimen thickness, so it is important to compare haze between different materials only at comparable thicknesses and specimen surface characteristics.

Historically, Union Carbide, Amoco, and then Solvay Advanced Polymers, LLC have measured and tracked the color of all sulfone polymers using the internal parameter of color factor (CF). The plastics industry as a whole, on the other hand, uses yellowness index (YI) to quantify color of film and moldings. It is instructive to look first at these two quantities and how they relate to each other.

Yellowness index and color factor are two different quantities from the standpoint of the definition of the parameter. However, for practical purposes, they do correlate very well.

By definition, yellowness index (YI) is calculated from the equation below based on ASTM method D-1925:

$$YI = [100(1.28X - 1.06Z)]/Y$$

where in the equation above, X, Y and Z are the tristimulus transmittance components for red, green and blue lights, respectively, in the CIE system, based on illuminating the sample with a standard light source, such as illuminant C or illuminant D65 according to ASTM method D-1003.

Color Factor (CF), on the other hand, is defined as the following quantity:

$$CF = 270[(x+y)_{sample} - (x+y)_{air}]/t$$

Where x and y are the chromaticity coordinates obtained by normalizing the X and Y tristimulus values. The chromaticity coordinates x and y are calculated by the following equations:

$$x = X/(X+Y+Z)$$

$$y = Y/(X+Y+Z).$$

The variable t is the sample thickness in inches. So, unlike YI, CF is independent of thickness in the thickness range of typical molded components, which is one attractive aspect of the quantity. Color factor is independent of thickness up to about 1 inch thick. The 270 factor is an arbitrarily chosen factor intended primarily to bring the CF values into a convenient range to work with.

As mentioned above, yellowness index, light transmittance and haze are all thickness dependent properties so that thickness needs to be reported along with these measurements. Preferably multiple thicknesses should be measured to show the dependence of these properties on thickness over a practical range of thicknesses.

One of the key technical hurdles to achieving that goal is the elimination of yellowness from the resin, which is typically expressed as a color factor. A color factor target of <10 has been set for plastic molded parts to be considered of optical quality. This corresponds, in yellowness index terms (ASTM D-1925) to yellowness index of <1.9 for a 0.1 inch thick sample plaque. The lowest color factors achieved in molded articles of prior art commercially produced polysulfone have been in the 30-40 color factor range and more typically they have been in the 50-70 range. While PSU with solution batch color factors of under 25 has been produced based on improvements in PSU manufacture technology as described for, example, by Schwab et al. in U.S. Pat. No. 4,307,222, which is incorporated herein by reference in its entirety, the ability to produce melt fabricated articles with color factors of less than 25 has not been demonstrated.

To achieve the single-digit color factors needed, technology improvements are necessary in either or both the synthesis-process side and in the stabilization of the pellets supplied to the customers for prevention of additional color generation during melt fabrication into injection molded articles.

While lab batches of polysulfone with color factors under 10 CF can be produced, it is difficult to maintain this low color factor even with the mildest melt processing treatment. This behavior is exemplified by the plot shown in FIG. 1. This plot shows the progression of color factor of two polysulfone batches. Samples of the polysulfone powder were heat aged in a melt indexer at 300° C. and various times to monitor the dependence of color factor on 300° C. exposure time. It can be seen from FIG. 1 that even after 2 minutes at 300° C., both polysulfone samples approximately double in color factor, and after 12 minutes the color factor has risen to roughly 3× the original value. This behavior is disconcerting, considering that 300° C. is at the lower limit of where polysulfone can realistically be melt fabricated by injection molding.

FIG. 2 is a graph showing the correspondence between CF and YI for a number of UDEL® lots as measured on plaques 0.1 inch thick. As can be seen from this figure, the relationship between the two variables is essentially a straight line that passes through the origin. For a given color factor, the corresponding yellowness index on a 0.1 inch thickness specimen is closely approximated by multiplying CF by 0.19. The straight line relationship between CF and YI shows how the color factor measurement relates to the more widely used yellowness index parameter.

Yellowness in polysulfone has been believed to be primarily responsible for most of the absorbance over the visible spectrum. Thus, achieving the high transmittance characteristics exhibited by a colorless resin like polycarbonate had been largely equated with removal of yellowness. To assess this hypothesis, polysulfone with different color factors was correlated with the transmittance characteristics at various wavelengths. A family of curves illustrating transmittance dependence on color factor is shown in FIG. 3. At incident wavelengths above 540 nm, the transmittance is essentially independent of UDEL® color factor within the color factor range of interest (0 to 60). However, the dependence becomes progressively stronger at shorter and shorter wavelengths and is rather steep at wavelengths in the 400-420 nm range. Since recent experiments have produced polysulfone plaques with color factors in the low twenties, these new low color samples were used in combination with other data to allow extrapolation and prediction of transmittance behavior in the 0-10 target color factor range.

The production of <10 color factor UDEL® polysulfone in lab glassware is feasible, however, it has not previously been possible to maintain that low color factor through even the most mild melt processing. It was therefore concluded that a color stabilization package for polysulfone would be necessary if a viable ultra-low color polysulfone that can maintain its color during injection molding into finished optical elements is to be produced.

To develop an ultra-low color/optical quality polysulfone resin, a series of experiments was conducted to screen and optimize an appropriate additive package that would prevent or minimize color development during melt fabrication of the polymer. In studies conducted it was established that color factors under 10 could be achieved for polysulfone as made in the reactor. The color, however, rapidly rises to unacceptable levels when the recovered polymer is exposed to temperatures as low as 300° C. for times as short as 2 minutes. It became clear that a resin stabilization scheme was necessary and a key part of the solution to the polysulfone color problem.

From the extrapolations shown in FIG. 3, hypothetical spectral transmittance curves were generated for UDEL® polysulfone having 10 and 0 color factors to see how they contrast against the transmittance curve of general purpose polycarbonate resin (LEXAN® 104 available from General Electric). This spectral transmittance curve comparison is shown in FIG. 4.

SUMMARY OF THE INVENTION

There exists a need in the polymer composition art for a transparent polymer composition that has a high light transmittance. There exists a need in the polymer composition art for a clear, "water white" polysulfone composition. In the thermoplastic molding art, there exists a need for a transparent, high-light transmittance polysulfone composition with a low yellowness index. There further exists a need in the optical arts for optical components, such as a high refractive index, lightweight, ophthalmic lens with low yellowness index and high light transmittance.

These and other needs are met by certain embodiments of the present invention, which provide a polysulfone composition having a total luminous light transmittance of 84% or greater when measured on 0.1 inch thick specimens using ASTM D-1003. The specimens also meet at least one of the following two conditions: 1) a yellowness index (YI) of less than about 5.0 as measured according to ASTM D-1925 on 0.1 inch thick specimens, or 2) a color factor (CF) of less than about 25, wherein CF is defined by the following equation:

$$CF=270[(x+y)_{sample}-(x+y)_{air}]/t$$

wherein x and y are chromaticity coordinates measured in transmittance mode and t is sample thickness in inches.

The earlier stated needs are also met by certain embodiments of the present invention which provide melt fabricated, injection molded, compression molded, extruded, blow-molded, hybrid injection-compression molded, or thermoformed articles made from a polysulfone composition having a total luminous light transmittance of 84% or greater when measured on 0.1 inch thick specimens using ASTM D-1003. The specimens also meet at least one of the following two conditions: 1) a yellowness index (YI) of less than about 5.0 as measured according to ASTM D-1925 on 0.1 inch thick specimens, or 2) a color factor (CF) of less than about 25, wherein CF is defined by the following equation:

$$CF=270[(x+y)_{sample}-(x+y)_{air}]/t$$

wherein x and y are chromaticity coordinates measured in transmittance mode and t is sample thickness in inches.

The earlier stated needs are also met by certain embodiments of the present invention which provide a polysulfone composition comprising a polysulfone, an organic phosphorous containing melt stabilizer, and at least one of the following additives: a blue to violet dye and an organic optical brightener.

The earlier stated needs are also met by certain embodiments of the present invention which provide a transparent, molded polysulfone article having a yellowness index less than 1.00.

The earlier stated needs are further met by certain embodiments of the present invention, which provide an optical component, such as an ophthalmic lens having a yellowness index less than 1.00.

In addition, the earlier stated needs are met by certain embodiments of the present invention which provide a transparent layer of polysulfone having a yellowness index of less than 1.00.

Suitable melt stabilization schemes have been identified that inhibit thermally induced color development during processing operations. In certain embodiments of the present invention, the stabilizer Sandostab PEPQ is used at loading levels of about 750 ppm. Trace amounts of a violet to blue dye and/or an optical brightener can also be used to offset, either completely or partly, remaining yellowness in the resin. Color factors as low as 11 with low haze, high transmittance and good overall aesthetics have been achieved on molded plaques based on embodiments of this invention.

The present invention addresses the longstanding limitation of yellowing in polysulfone thereby allowing modified compositions that reach the clarity levels needed for lens applications to be possible for the first time. The present invention enables, for the first time, the production of nearly colorless polysulfone with high light transmittance characteristics over the visible spectrum.

DETAILED DESCRIPTION OF THE INVENTION

Figure 1:
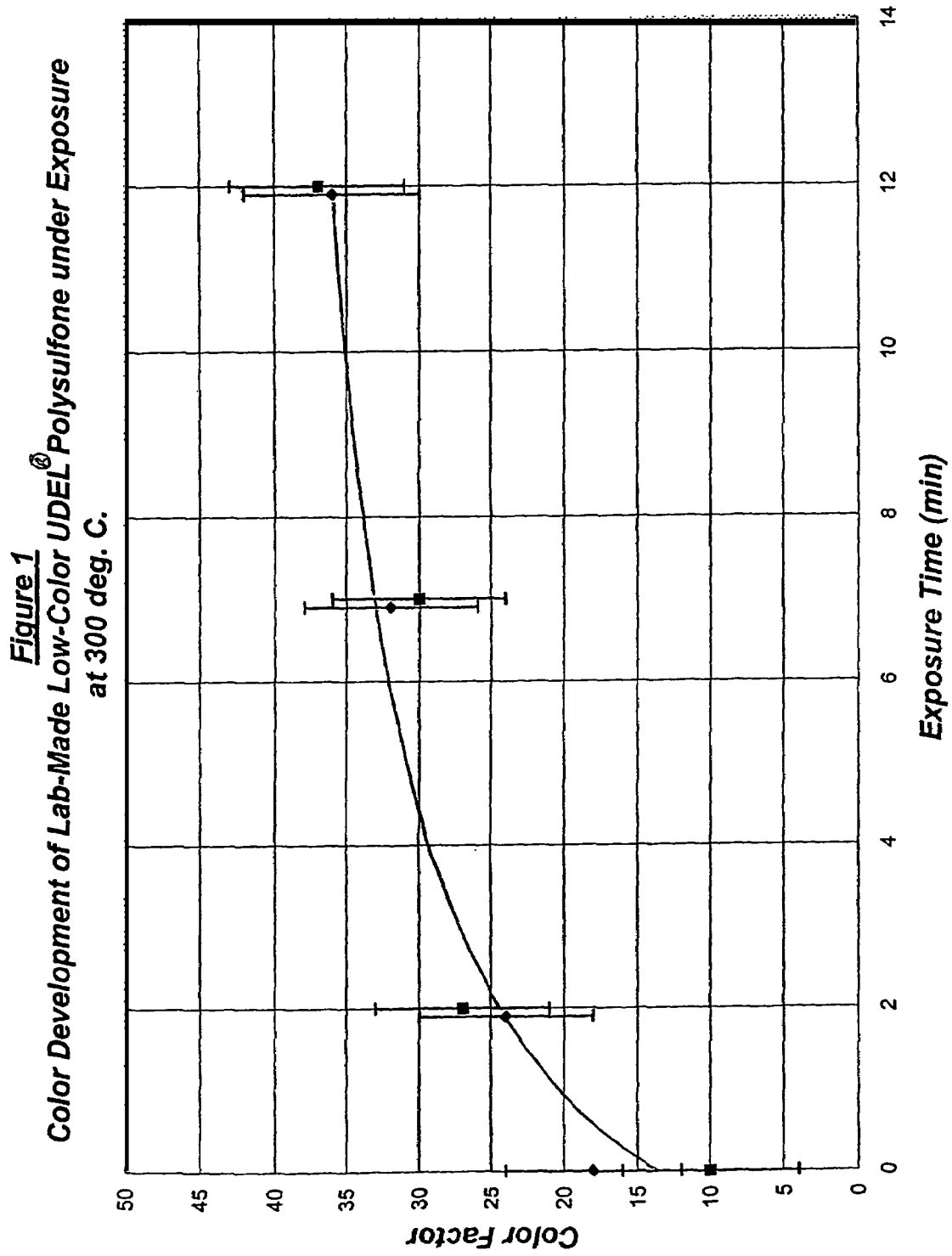
FIG. 1 graphically illustrates the progression of the color factor of polysulfone upon exposure to 300° C.
Figure 2:
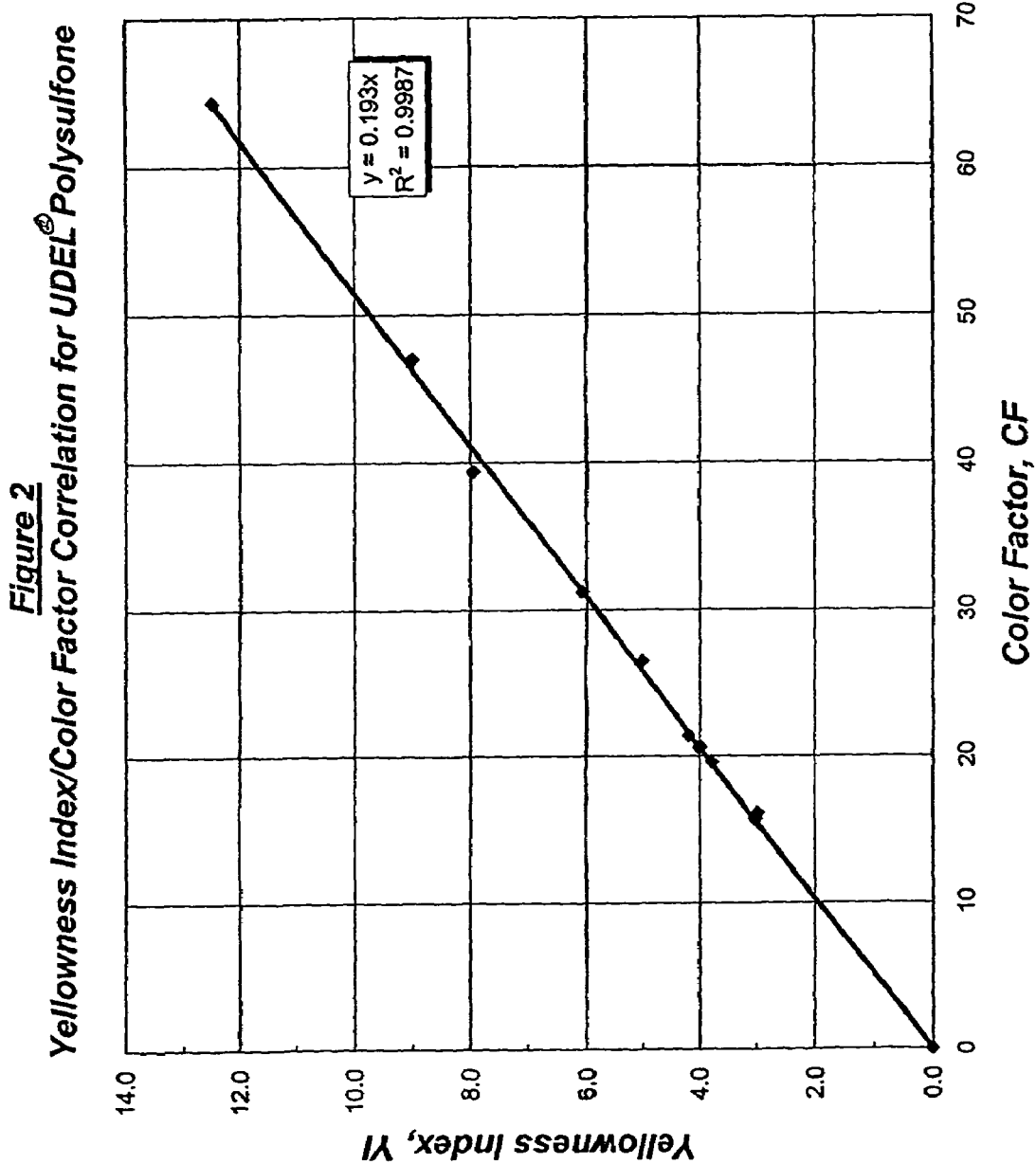
FIG. 2 graphically illustrates the correspondence between color factor and yellowness index as measured on 0.1 inch thick plaques.
Figure 3:
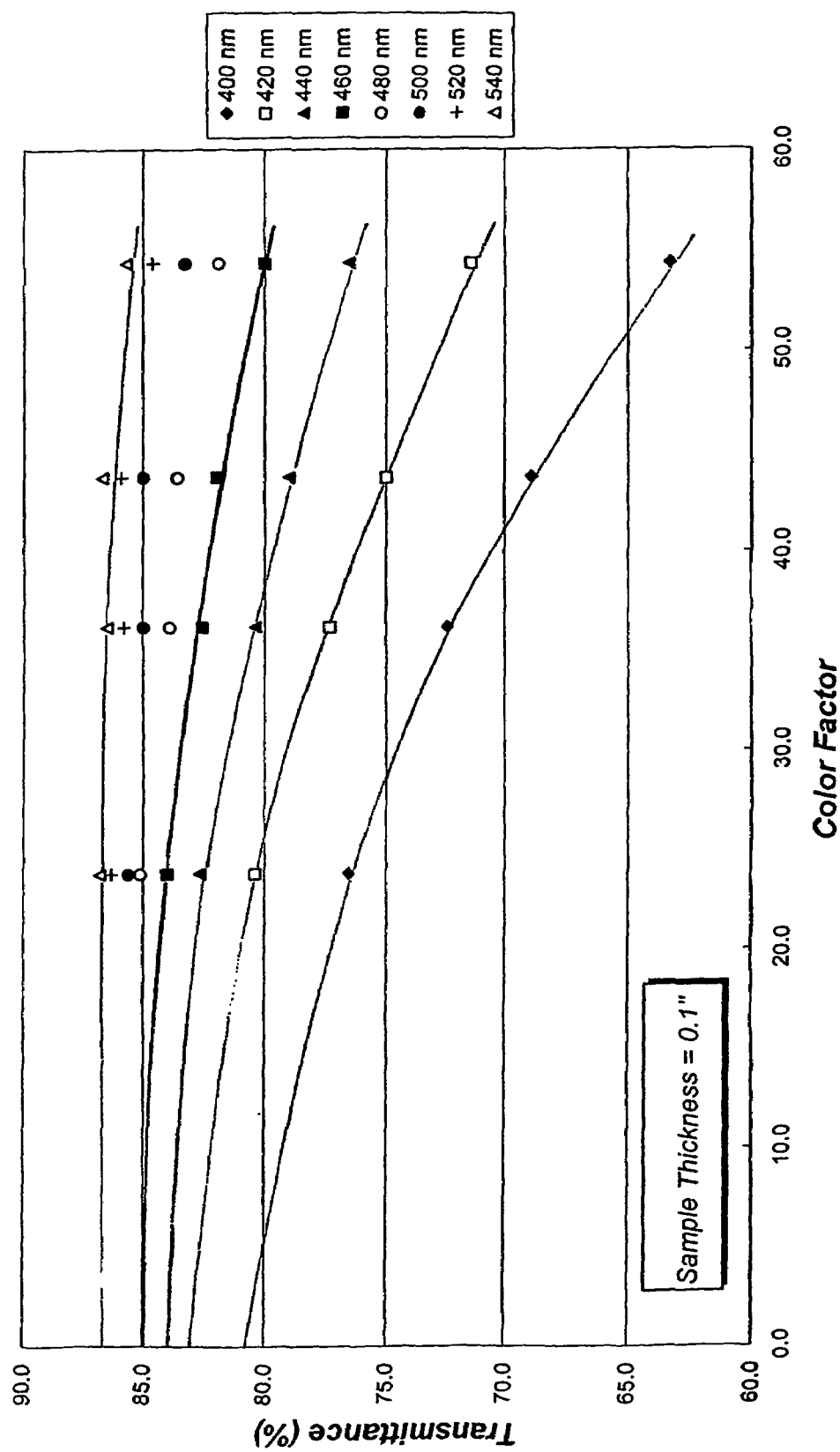
FIG. 3 graphically illustrates transmittance dependence on color factor as measured on 0.1 inch thick plaques.
Figure 4:
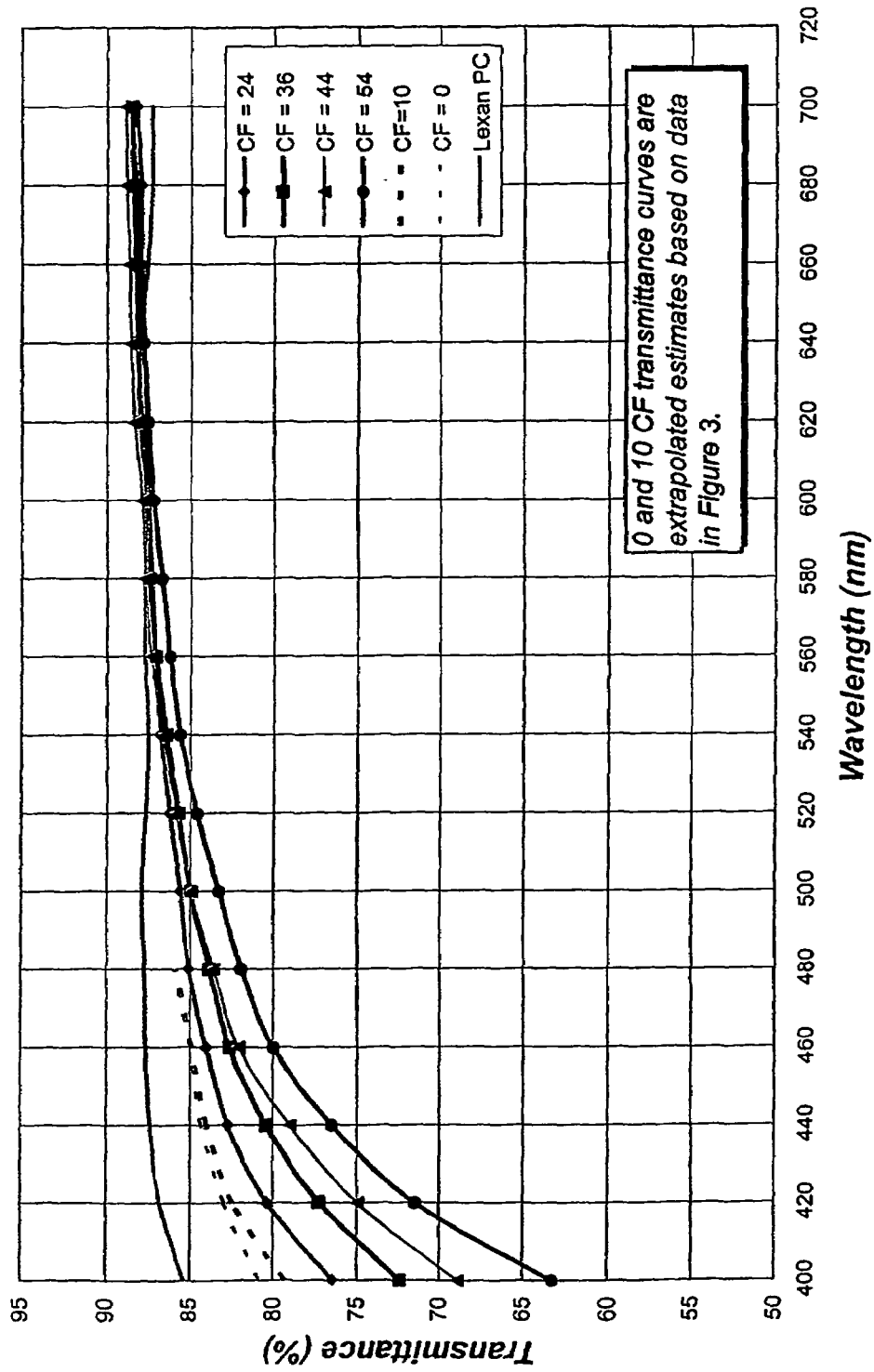
FIG. 4 graphically contrasts the transmittance of polysulfone and polycarbonate.

The present invention enables the production of molded polysulfone articles with improved light transmittance and reduced yellowing. The present invention provides lightweight, high-light transmittance ophthalmic lenses. The present invention allows the high temperature handling and molding of polysulfone without the attendant decrease in light transmittance and increased yellowing observed in prior art polysulfone compositions. These benefits are provided by a polysulfone composition comprising small amounts of additives selected from organic phosphorous-containing melt stabilizers, optical brighteners, and blue to violet dyes.

This invention will be described in conjunction with specific examples of polysulfone compositions. However, these are exemplary only, as the claimed invention is not limited to the specific examples described herein.

This invention relates to bisphenol A polysulfone compositions that are very low in color and yellowness and high in light transmittance over the visible spectrum. Color factors below 20 have been achieved as compared to color factors in the 30-40 range being possible previously from commercially available polysulfone. At color factors below about 20 (yellowness index less than about 4.0 at a 0.10" sample thickness) a resin becomes a candidate for use in optical components. Certain embodiments of this invention comprise bisphenol A polysulfone to which is added 30 to 3000 ppm of an organic phosphite and/or organic phosphonite, and, additionally contains either 1. 0.5 to 500 ppm of an optical brightener, or
2. 0.1 to 100 ppm of one or more blue to violet dyes or a combination of (1) and (2) above. The amount of the additives is based on the total weight of the composition.

Certain polysulfone compositions of the instant invention comprise 100 to 1000 ppm of the organic phosphite and/or organic phosphonite, and, additionally contain either:

1. 5 to 50 ppm of an optical brightener, or
2. 1 to 10 ppm of one or more of the blue to violet dyes, or a combination of the optical brightener and the blue to violet dyes.

Additional embodiments of the present invention consist of a polysulfone and an organic phosphite and/or organic phosphonite, and, additionally either:

1. 5 to 50 ppm of an optical brightener, or
2. 1 to 10 ppm of one or more of the blue to violet dyes, or a combination of the optical brightener and the blue to violet dyes.

Polysulfones used in the practice of this invention can be of any practical molecular weight to afford melt processability and good physical and mechanical properties. In certain embodiments of the present invention, the number average molecular weight for the PSU is greater than 13,000 g/mole. In other embodiments of the present invention the number average molecular weight is greater than 15,000 g/mole as measured by gel permeation chromatography using methylene chloride as the solvent and polystyrene calibration standards. In order to allow for melt processing at temperatures as low as possible it is also desirable for the resins of this invention to have melt flow rates of at least 7 g/10 min as measured according to ASTM method D-1238 at a temperature of 343° C. and a load of 2.16 kg. In certain embodiments of the present invention, the melt flow rate of the PSU will be at least 10 g/10 min and in other certain embodiments, at least 15 g/10 min at the conditions stated.

Compositions comprising copolymers of polysulfone fall within the scope of the invention. These include copolymers in which the bisphenol portion of the reactants in the condensation polymerization is comprised of at least 75 mole % bisphenol A and up to 25% of (an)other bisphenol(s), such as bisphenol S (4,4'-dihydroxydiphenylsulfone), bisphenol O (4,4'-dihydroxydiphenylether), biphenol (4,4'-dihydroxydiphenyl), or hydroquinone ($C_6H_4(OH)_2$).

The organic phosphorous-containing melt stabilizers suitable for use in the practice of this invention can be from the phosphite or phosphonite family or mixtures thereof Suitable phosphites that include mono and dialkyl substituted aromatic phosphites. In certain embodiments of the present invention the phosphites are di-t-butyl substituted aromatic phosphites, such as tris(2,4di-t-butyl-phenyl) phosphite. In other certain embodiments of the present invention suitable phosphites include those containing the pentaerythritol moiety. These include compounds such as: bis(2,4-di-t-butylphenyl)pentaerythritol diphosphite, distearyl pentaerythritol diphosphite, and bis(2,4-dicumylphenyl) pentaerythritol diphosphite. Aromatic phosphonites are also suitable in certain embodiments of this invention, particularly aromatic mono and diphosphonites. A particularly suitable phosphonite is tetrakis(2,4di-tert-butylphenyl)[1,1-biphenyl]-4,4'-diylbisphosphonite. In certain embodiments of this invention this phosphonite is used in combination with a phosphite from the above described phosphites. In certain embodiments of this invention the phosphonite used in combination with the phosphonite is tris(2,4t-butylphenyl)phosphite. In such mixtures the phosphonite is preferred to be the major component and the phosphite the minor one. A stabilizer composition which fits this description is sold commercially under the trademark Sandostab PEPQ™. Sandostab PEPQ™ has been found to be particularly well-suited for use in the practice of this invention.

Prior to this invention, polysulfones with the lowest color factors available commercially have been in the 30-40 color factor range and more typically they have been in the 50-70 range. This invention introduces polysulfone color factors approaching 10, making polysulfone a serious candidate in optical lens applications for the first time in its history.

Controls C1 and C2 and Examples 1-7

A first set of experiments examined the potential benefits of eight additive system scenarios on inhibiting polysulfone color development during melt processing. In each case, the additives were compounded using a 25 mm Berstorff twin screw extruder at a melt temperature of about 325° C. Various compositions according to the present invention are listed in Table 1. The stabilized samples were compared for their optical properties with a virgin control and a 'blank' extruded control to separate the effect of the compounding heat history from the role played by the additives. After compounding, the samples were injection molded (at about 325° C. melt temperature) to produce 0.10" color plaques which were tested for color factor, yellowness index, haze, and luminous light transmittance, which according to ASTM D-1003 is the same as the Y component of the tristimulus values.

TABLE 1

Compositions of Controls C1 and C2, Comparative Examples C3–C6 and Examples 1–3

| Example | Compositions |
|---|---|
| C1 | 100% UDEL ® P-3703 polysulfone (virgin resin, no compounding) |
| C2 | 100% UDEL ® P-3703 (extruded control) |
| C3 | 0.075% Weston 618 ™ and balance UDEL ® P-3703 NT |
| C4 | 0.075% Sandostab PEPQ ™ and balance UDEL ® P-3703 NT |
| C5 | 0.075% Irgafos ™ 168 and balance UDEL ® P-3703 NT |
| C6 | 0.015% HP-136 ™ and balance UDEL ® P-3703 NT |
| 1 | 0.075% Weston 618 ™, 0.015% HP-136, and balance UDEL ® P-3703 NT |
| 2 | 0.075% Sandostab PEPQ ™, 0.015% HP-136, and balance UDEL ® P-3703 NT |
| 3 | 0.075% Irgafos 168 ™, 0.015% HP-136 ™, and balance UDEL ® P-3703 NT |

The basis for all the above compositions is weight percent based on the total weight of the composition. Weston 618™ is a pentaerythritol based phosphite available from General Electric Specialty Chemicals, Inc. PEPQ™ is a mixture of a phosphite and phosphonites available from Clariant Corp. Irgafos 168™ is a phosphite available from Ciba Specialty Chemicals, Inc. HP-136™ is a lactone-based melt stabilizer available from Ciba Specialty Chemicals, Inc. The structure of Weston 618™, Sandostab PEPQ™, Irgafos 168™, and HP-136™ are shown in Tables 2 and 3. The above compositions were compounded on a Berstorff 25 mm twin screw extruder using mild conditions (melt temperature ~325° C.). They were molded into 0.1 inch (2.5 mm) thick color plaques also using mild melt temperature of ~325° C. Details of the experiments and results are presented below. Other organic phosphites and/or phosphonites can also be used in the practice of this invention, as would be clear to one of ordinary skill in this art. Other suitable organic phosphites include Dover Chemical's Doverphos S-9228™.

TABLE 2

Phosphites and phosphonites used in embodiments of the invention.

| Trade Name | Chemical Name | Supplier | Chemical Structure |
|---|---|---|---|
| Weston 618 ™ | Distearyl pentaerythritol diphosphite | GE Specialty Chemicals, Inc. | I |
| Sandostab PEPQ ™ | Mixture of three phosphonites and one phosphite | Clariant Corp. | II |
| Irgafos 168 ™ | Tris(2,4-di-t-butyl phenyl) phosphite | Ciba Specialty Chemicals, Inc. | III |
| Ultranox 626 ™ | Bis(2,4-di-t-butyl phenyl) pentaerythritol diphosphite | GE Specialty Chemicals, Inc. | IV |
| Weston TLP ™ | Trilauryl phosphite | GE Specialty Chemicals, Inc. | V |

TABLE 3

Other additives used in embodiments of the invention.

| Trade Name | Chemical Name | Supplier | Chemical Structure |
|---|---|---|---|
| Calco Oil Violet ZIRS ™ | 1-hydroxy-4-{(4-methylphenyl)amino)-9,10-anthracenedione | BASF | VI |
| Eastobrite OB-1 ™ | 2,2'-(1,2-Ethenediyldi-4,1-phenylene)bisbenzoxazole | Eastman Chemical Co. | VII |
| Eastobrite OB-3 ™ | 2,2'-(1,2-Ethenediyldi-4,1-phenylene)bisbenzoxazole | Eastman Chemical Co. | VII |
| HP-136 ™ | 5,7-di-t-butyl-3-(3,4 dimethylphenyl)-3H-benzofuran-2-one | Ciba Specialty Chemicals, Inc. | VIII |

Chemical Structures of Phosphites and Phosphonites listed in Table 2

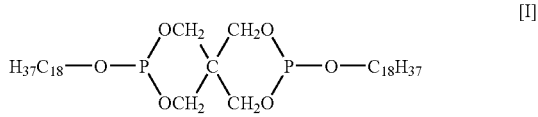

[I]

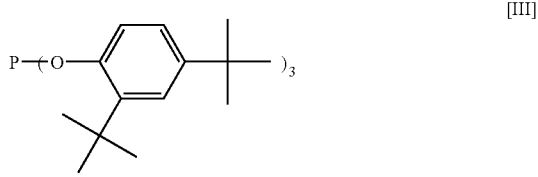

[III]

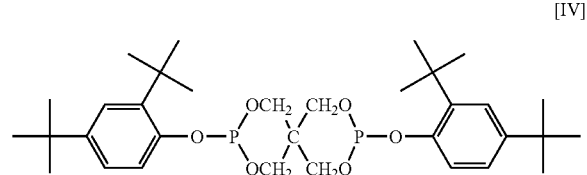

[IV]

[V]

Structure and composition of PEPQ™.
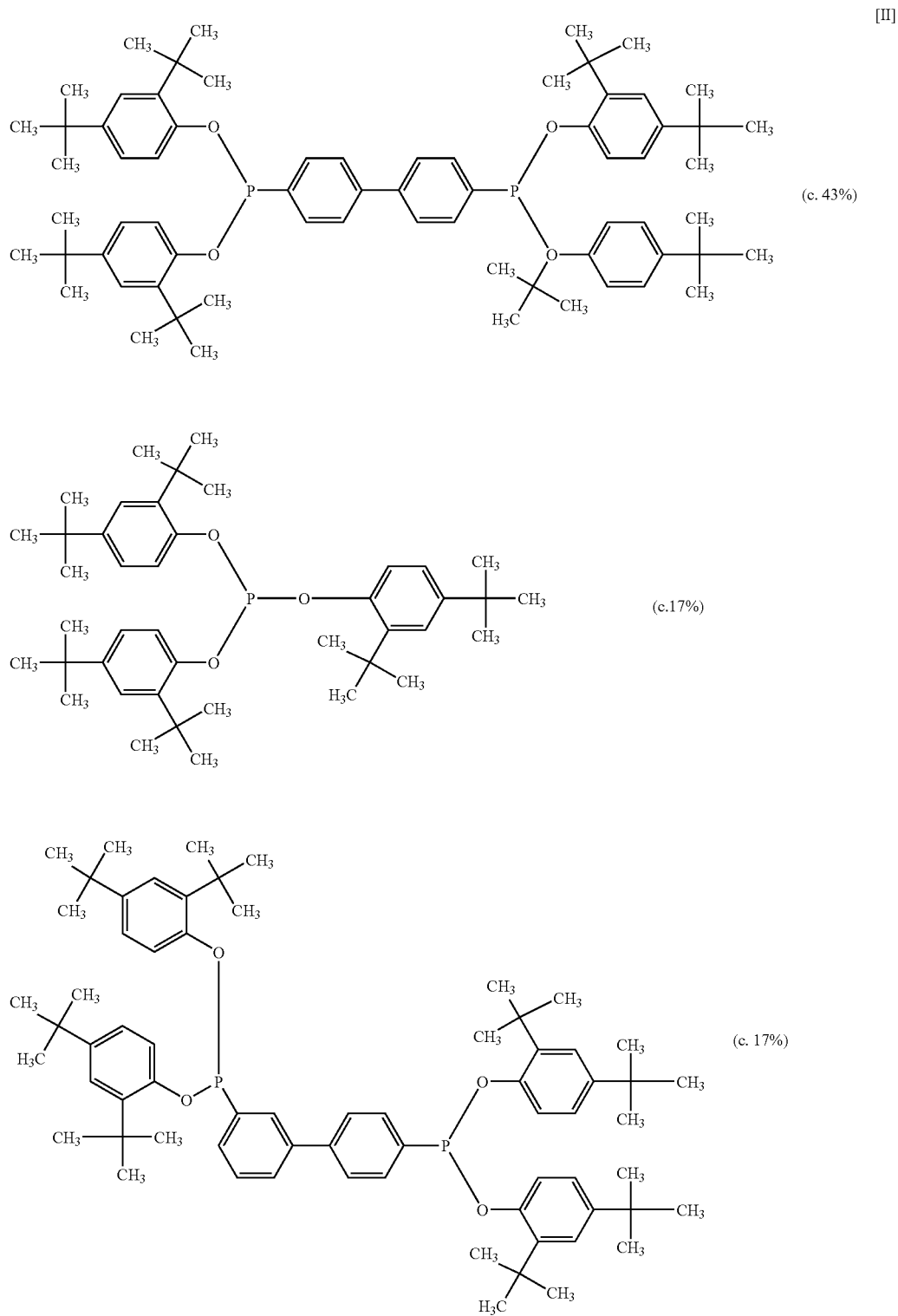

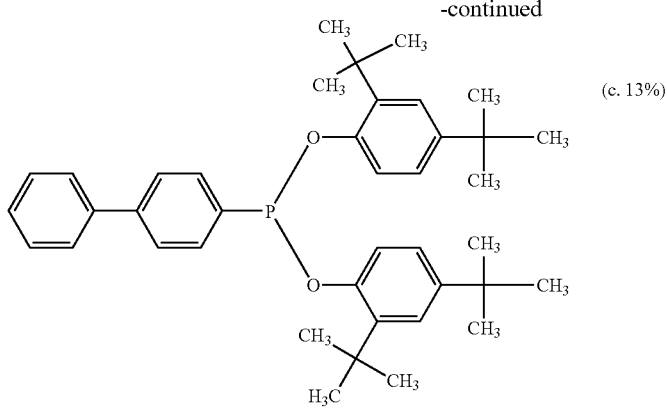

(c. 13%)

The chemical structure of the dye, optical brighteners and HP-136™ stabilizer listed in Table 3.

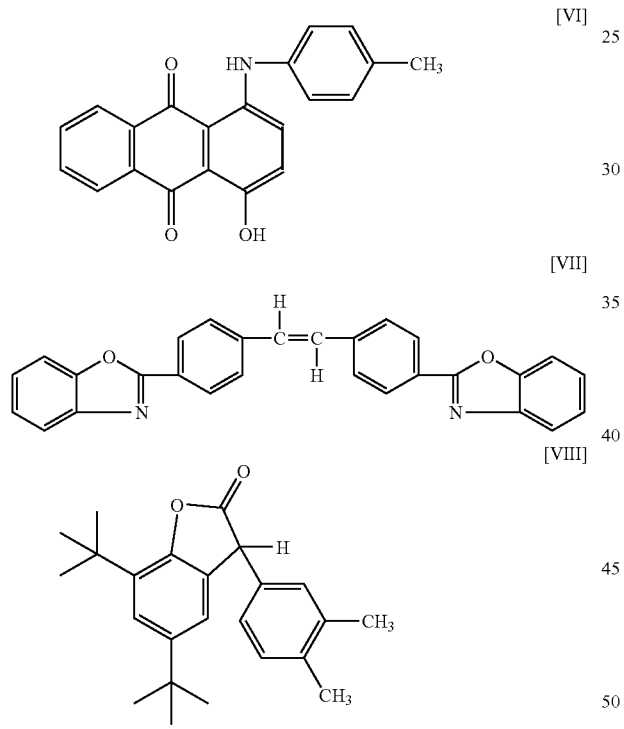

[VI]

[VII]

[VIII]

TABLE 4

Test Methods

| Test | Method | Description/Conditions |
|---|---|---|
| Yellowness Index | ASTM D-1925 | Nominal sample thickness = 0.1 in. |
| Light Transmittance | ASTM D-1003 | Nominal sample thickness = 0.1 in. |
| Haze | ASTM D-1003 | Nominal sample thickness = 0.1 in; A spectrophotometer was used rather than a haze meter. |
| Color Factor | Test Method 1 | See Test Method 1 description. |
| Melt Stability Viscosity Ratio, $VR_{40}$ | Test Method 2 | See Test Method 2 description. |

Test Methods:

1. Color Factor (CF) is determined by first performing measurements to obtain the three tristimulus values X, Y and Z in transmittance mode. Then the normalized stimuli x and y are calculated for the sample according to $x=X/(X+Y+Z)$ and $y=Y/(X+Y+Z)$ and they are also determined for the reference (air). The color factor is then calculated using the equation: $CF=270[(x+y)_{sample}-(x+y)_{air}]/t$, where t is sample thickness in inches. Illuminant C and an observer angle of 2 degrees are used for the generation of the X, Y and Z values.

2. Melt stability viscosity ratio, $VR_{40}$, is a measure of polymer melt stability under conditions that simulate a thermally abusive melt fabrication condition. The test involves measuring the melt viscosity of the material at 410° C. and a shear rate of 50 reciprocal seconds over a period of 40 minutes. The viscosity at 40 minutes is divided by the viscosity at 10 minutes to provide the 40-minute/10-minute viscosity ratio, $VR_{40}$ and the initial (10-minute) viscosity, Vis-10 is also reported in poise as part of the test results. A $VR_{40}$ of 1.0 represents a material that exhibits ideal behavior from the standpoint of its rheological stability in melt processing. Generally $VR_{40}$ values between 0.5 and 2.0 are considered representative of a stable material. $VR_{40}$ values between 0.75 and 1.5 are considered representative of very stable material.

TABLE 5

Test results for Controls C1 and C2, Comparative Examples C3–C6 and Examples 1–3

| | Examples | | | |
|---|---|---|---|---|
| Testing Information: | C1 | C2 | C3 | C4 |
| Color factor on 0.1" plaque | 58.6 | 94.2 | 70.5 | 55.6 |
| Yellowness Index on 0.1" plaque | 10.98 | 17.32 | 13.31 | 10.5 |
| X | 79.7 | 76.81 | 78.71 | 79.74 |
| Y [Light Transmittance] (%) | 84.32 | 81.3 | 83.28 | 84.36 |
| Z | 81.89 | 74.48 | 79.33 | 82.38 |
| Haze (%) | 4.36 | 4.84 | 4.44 | 5.62 |
| VR40 | 0.95 | 0.79 | 1.14 | 1.25 |

| | Examples | | | | |
|---|---|---|---|---|---|
| Testing Information: | C5 | C6 | 1 | 2 | 3 |
| Color factor on 0.1" plaque | 79.4 | 85.3 | 59.7 | 64.8 | 76.4 |
| Yellowness Index on 0.1" plaque | 14.72 | 15.72 | 11.23 | 12.02 | 14.13 |

TABLE 5-continued

Test results for Controls C1 and C2, Comparative Examples C3–C6 and Examples 1–3

| X | 78.07 | 77.5 | 79.15 | 78.95 | 78.61 |
|---|---|---|---|---|---|
| Y [Light Transmittance] (%) | 82.62 | 82.12 | 83.77 | 83.62 | 83.29 |
| Z | 77.59 | 76.01 | 81.2 | 80.31 | 78.65 |
| Haze (%) | 4.36 | 4.52 | 5.88 | 4.78 | 4.45 |

The above compositions were compounded in 15 pound lots. The compositions were compounded at a temperature profile so that a melt temperature of about 325° C. was achieved. The conditions were kept as near constant as possible for all runs. The compositions were run at a throughput rate of about 30 lb/hr and an RPM of about 200. The temperature settings of the extruder are listed in Table 6.

TABLE 6

Barrel zone temperature settings and actual temperatures used in compounding examples C2–C6 and 1–3.

| ZONE | Set Point (° C.) | Actual Temperature (° C.) |
|---|---|---|
| Barrel 1 | 283 | 282 |
| Barrel 2 | 289 | 289 |
| Barrel 3 | 289 | 288 |
| Barrel 4 | 292 | 292 |
| Barrel 5 | 276 | 280 |
| Barrel 6 | 281 | 281 |
| Barrel 7 | 275 | 290 |
| Die | 274 | 274 |

About 10 plaques of each composition at 0.1" thickness were molded under normal conditions with a melt temperature close to 325° C. and conditions maintained as near identical as possible for all compositions. Ejection molding was performed on an Arburg 75 ton machine at a temperature of at least 100° C., under the conditions listed in Table 7. All the blends were dried at 150° C. for 4 hrs prior to molding.

TABLE 7

Injection Molding Conditions used for preparing samples of examples C1–C6 and 1–3.

| Molding Conditions: | | |
|---|---|---|
| Pressures (psi) | Injection | 700 |
| | Hold | 300 |
| Screw RPM | | 200 |
| Temperatures Zone | | Reading |
| Rear (° C.) | | 330 |
| Middle (° C.) | | 330 |
| Front (° C.) | | 328 |
| Nozzle (° C.) | | 325 |
| Mold stationary (° F.) | | 290 |
| Mold moving (° F.) | | 300 |
| Melt temperatures taken during molding (° C.): 330, 327, 328, 330, 326 and 324 | | |
| Timers (sec) | Injection | 1.5 |
| | Injector hold | 14.0 |
| | Cooling | 15.0 |

Results from this first set of experiments are summarized in Table 5. From the data the following observations were noted. 1) simply compounding the polysulfone resin added about 35 color factor units (or 59%) as compared to the virgin resin. 2) Two phosphite stabilizer options (Weston 618™ and PEPQ™ each used at 750 ppm) arrested color development during compounding and molding to a major extent, yielding color factors that are lower than that of the virgin control. Light transmittance and yellowness index values track CF data in a predictable manner. Haze results from this experiment showed an increase of about 1 haze unit relative to the extruded control.

Controls C7 and C8 and Examples 46

In this series of experiments, instead of compounding, the additive(s) employed were dusted onto the pellets by tumble blending vigorously in plastic buckets to achieve a uniform coating on the pellets. The dusted pellets were then molded and optical measurements performed on the molded plaques. This procedure change was implemented in an effort to remove the color increase associated with the compounding step and allow the lowest color factors possible to be realized.

Direct stabilizer addition to polysulfone during injection molding to avoid the need for a compounding step to incorporate the stabilizer was investigated. This approach reduces the overall heat exposure of the resin and may allow one to more easily achieve the target resin clarity and color in the molded or fabricated article. Since the target level of stabilizer is so low (<1000 ppm) it is expected that a fine layer of the stabilizer uniformly covering the pellets can be attained without causing loss of the stabilizer or excessive dusting when the mix is handled in solids handling equipment (e.g. at a molder's shop). The efficacy of this approach on low color UDEL®, which has a color factor in the 30s, and the addition of two phosphite stabilizers was investigated.

No compounding was employed for this series. The blending was performed "in situ" in an Arburg 75 ton injection molding machine during the preparation of the color chips. About 5 lb of each of the Examples 46 compositions first underwent sufficiently vigorous dry-blending to ensure that the stabilizers, which are powders formed to a fine dust on the surface of the pellets. The dusted pellets were then dried in a desiccated oven at 150° C. for 4 hours and each of the dusted compositions and the controls were molded into 2"×3"×0.1" color chips. Mild molding conditions were employed to avoid excessive heating and discoloration in the melt. A melt temperature in the range of about 320-330° C. was used. In certain embodiments of the instant device the melt temperature is set to 325° C. Back pressure was kept to about 50 psi to avoid excessive working of the resin and a screw speed of about 50 rpm was used. The total cycle time was kept at about 30 seconds or less. This corresponds to an average machine residence time of about 2 minutes.

Optical properties testing was performed on the molded color chips and the test data is presented in Table 9.

TABLE 8

Compositions of Controls C7 and C8 and Examples 4-6.

| | Examples | | | | |
|---|---|---|---|---|---|
| Components | C7 | C8 | 4 | 5 | 6 |
| UDEL ® P-3703 NT (wt. %) | 100 | 100 (Virgin control; no molding) | 99.925 | 99.925 | 99.85 |

TABLE 8-continued

Compositions of Controls C7 and C8 and Examples 4-6.

| | Examples | | | | |
|---|---|---|---|---|---|
| Components | C7 | C8 | 4 | 5 | 6 |
| Sandostab PEPQ ™ (wt. %) | — | — | 0.075 | — | 0.075 |
| WESTON 618 ™ (wt. %) | — | — | — | 0.075 | 0.075 |

In the above examples, UDEL® P-3703 NT polysulfone had a color factor of about 30 before dusting.

The compositions in Table 8 were dusted, dried, then injection molded into color plaques (2"×3"×0.10") using an Arburg 75 ton machine and mild processing conditions (melt temp. ~325° C.). Optical properties were measured on the color plaques and these included the following: color factor, haze, light transmittance, X, Y, Z tristimulus coordinates, yellowness index, and a light transmittance vs. wavelength profile. Results are fully documented herein.

The results from the second set of experiments are shown in Table 9. Again, the beneficial effects of the phosphites on arresting color development during molding were demonstrated. In this case, the color factors of the stabilized samples were in the mid 20's and 10 color factor units below the virgin control. This resulted in UDEL® polysulfone with molded color factors in the 20's, lower than previously obtained. The haze numbers for the stabilized samples were not greater than those of the control.

TABLE 9

Optical properties tested on Control C7 and Examples 4-6.

| | Examples | | | | |
|---|---|---|---|---|---|
| Testing Information: | C7 | 4 | 5 | 6 | C8 |
| Sample Thickness (in) | 0.100 | 0.100 | 0.101 | 0.101 | — |
| Color Factor on plaque | 36.2 | 23.8 | 25.7 | 23.3 | — |
| Light Transmittance (Y) | 86.66 | 87.26 | 86.94 | 87.17 | — |
| X | 84.60 | 85.29 | 84.98 | 85.21 | — |
| Z | 96.47 | 99.16 | 98.42 | 99.08 | — |
| Yellowness Index [D-1925] | 6.75 | 4.44 | 4.90 | 4.43 | — |
| Haze [D-1003] (%) | 3.77 | 4.50 | 6.98 | 5.27 | — |

Controls C9 and C10 and Examples 7-12

Additional fine-tuning and multi-component additive systems were further explored in an attempt to achieve the lowest possible color. Phosphites were combined in combination with either a blue or violet dye or an optical brightener to partly offset the yellowness, which cannot be completely removed with stabilization alone. These experiments are summarized in Table 10. In addition to the composition improvements approach described, additional process improvements in this set of experiments included switching the molding to a short residence time 'mini injection molding machine' (Wasp Mini-jector™) which is maintained in pristine condition in the sulfone polymers R & D lab at Solvay Advanced Polymers, LLC. Another process improvement was the machining of an optical quality finish plaque mold. This 'class A' surface finish mold contributed to reduction in the haze values measured due to the elimination of plaque surface roughness which artificially inflates haze values.

Figure 5:
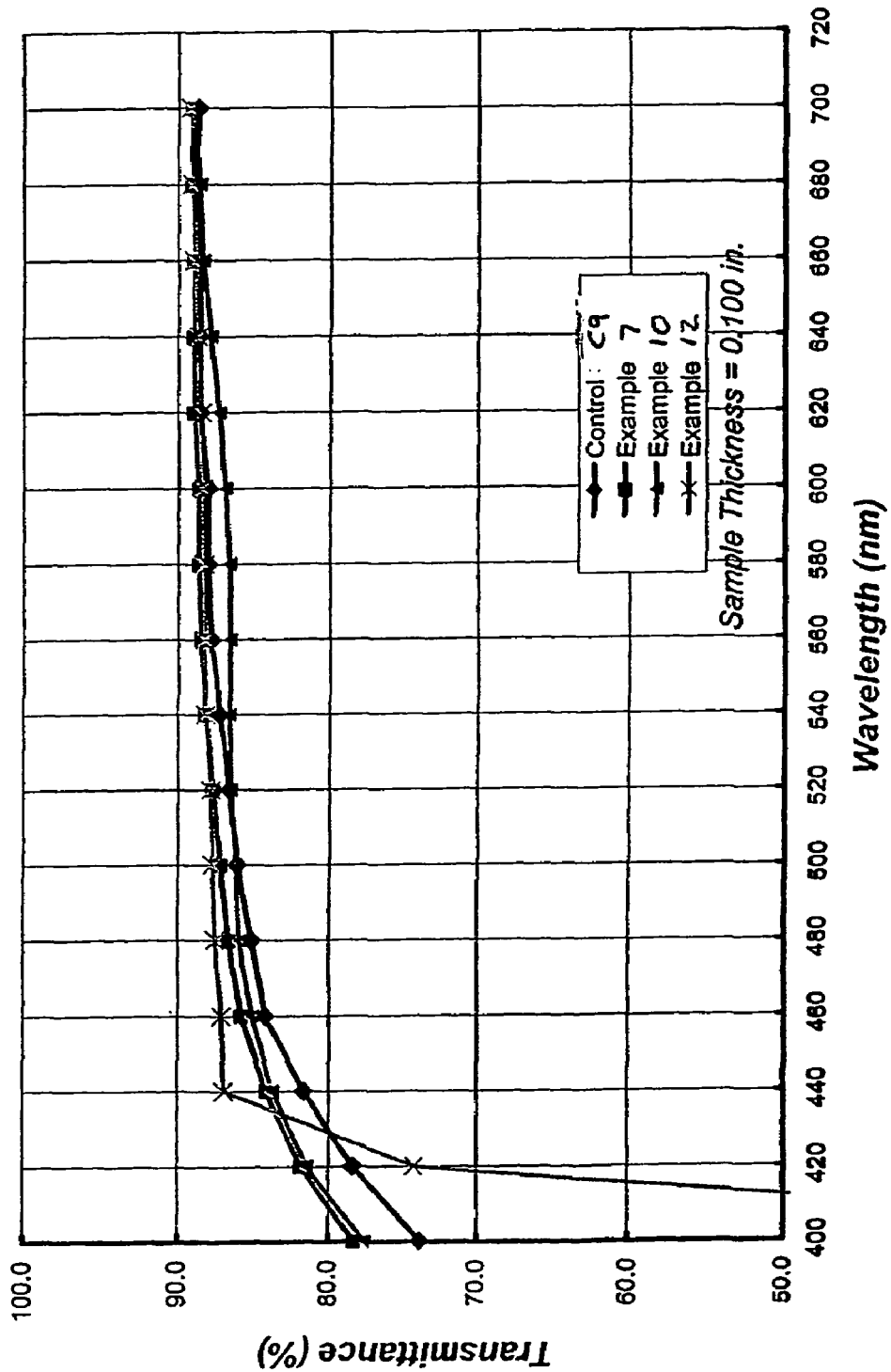
FIG. 5 graphically illustrates the visible transmittance spectra of polysulfone with various color stabilization additives according to the instant invention.

Lower yellowness indices were achieved with the set of experiments shown in Table 10. The addition of PEPQ™ at 750 ppm with the improved molding set up described produced a color factor of 21, as in Table 11, which is essentially identical to the pellet solution color factor on the same virgin lot of resin. What this means is that color generation during the molding process was completely eliminated with use of PEPQ in this experiment and the color factor represented a 33% reduction versus the virgin control case. Two embodiments of the present invention with excellent properties are depicted in the last two entries in Table 11. In one embodiment the PEPQ™ was combined with 2 ppm ZIRS Oil Violet™, and in another embodiment, it was combined with 25 ppm of Eastobrite OB-3™ optical brightener which is a molecule designed to absorb light in the near UV range and transmit it in the visible. According to their supplier, Eastobrite OB-1™ and Eastobrite OB-3™ comprise the same optical brightener compound as described in Table 3, however, the OB-3™ composition additionally contains a small amount of a blue dye preblended into it by the supplier. These compositions were again prepared using "dusting" as a means of incorporating the additives into the resin as opposed to compounding. This was in an effort to avoid introducing an intermediate heat history to the resin between the virgin pellets and injection molding into 2"×3"×0.10" plaques. In both cases color factors were depressed an additional 5 units from 21 to 16 without any significant increase in haze. While the color factors from these two options were identical, the light transmittance profiles were not. This can be seen in FIG. 5 where the transmittance curves of the four samples from this experiment are overlaid. The individual data points are also listed as values in Table 12. The ZIRS containing sample exhibits the characteristic absorption band in the 540-640 nm region manifested as a muted depression in the transmittance values in that region. The sample containing the optical brightener, on the other hand, shows high and relatively flat transmittance from 440 to 700 nm, but the transmittance decays sharply at wavelengths shorter than 440 nm. Visually, both samples look very clear and appealing.

TABLE 10

Compositions of Controls C9 and C10 and Examples 7-12

| | | Examples | | | | | | |
|---|---|---|---|---|---|---|---|---|
| Compositions | C9 | 7 | 8 | 9 | 10 | 11 | 12 | C10 |
| UDEL ® P-3703 NT (wt. %) | 100 | 99.925 | 99.925 | 99.925 | 99.925 | 99.925 | 99.925 | — |
| SANDOSTAB PEPQ ™ (wt. %) | — | 0.075 | — | — | 0.075 | 0.075 | 0.075 | — |
| ULTRANOX 626 ™ (wt. %) | — | — | 0.075 | — | — | — | — | — |
| WESTON TLP ™ (wt. %) | — | — | — | 0.075 | — | — | — | — |

TABLE 10-continued

Compositions of Controls C9 and C10 and Examples 7-12

| Compositions | Examples | | | | | | | |
|---|---|---|---|---|---|---|---|---|
| | C9 | 7 | 8 | 9 | 10 | 11 | 12 | C10 |
| ZIRS OIL VIOLET ™ (ppm) | — | — | — | — | 2 | — | — | — |
| EASTOBRITE OB-1 ™ (ppm) | — | — | — | — | — | 25 | — | — |
| EASTOBRITE OB-3 ™ (ppm) | — | — | — | — | — | — | 25 | — |
| GE LEXAN ® 104 (wt. %) | — | — | — | — | — | — | — | 100 |

Results of this experiment and additional details are given in Table 11.

TABLE 11

Optical and melt stability properties for Controls C9 and C10 and Examples 7-12

| Testing Information: | C9 | 7 | 8 | 9 | 10 | 11 | 12 | C10 |
|---|---|---|---|---|---|---|---|---|
| Plaque Thickness (in) | 0.102 | 0.106 | 0.106 | 0.103 | 0.104 | 0.106 | 0.104 | 0.115 |
| Color Factor | 31.2 | 20.6 | 21.4 | 26.5 | 15.7 | 19.6 | 16.1 | 3.5 |
| Yellowness Index | 5.91 | 4.00 | 4.19 | 5.03 | 3.03 | 3.80 | 2.99 | 0.66 |
| Light Transmittance, Y | 87.67 | 88.27 | 87.80 | 87.68 | 86.73 | 88.36 | 88.28 | 88.97 |
| X | 85.56 | 86.26 | 85.83 | 85.65 | 84.84 | 86.30 | 86.20 | 87.21 |
| Z | 98.25 | 100.7 | 100.0 | 99.09 | 99.80 | 100.9 | 101.4 | 104.6 |
| Haze (%) | 1.77 | 1.76 | 6.37 | 6.05 | 2.09 | 2.18 | 2.05 | 0.47 |
| VR40 at 410° C. | 0.96 | 0.96 | 1.06 | 0.96 | 1.02 | 0.97 | 0.98 | — |
| Vis10 at 410° C. (Poise) | 2000 | 1600 | 1800 | 1500 | 1700 | 1800 | 1700 | — |

About 10-2"×3"×0.1" color chips were injection molded from each of the above compositions. The compositions comprised pellets that have been dusted with the target levels of each of the powderous additives.

In order to successfully incorporate very small amounts (e.g. ppm levels) of additives into the PSU composition, a master batch of PSU and additive is prepared using a conventional compounding extruder to produce pellets of PSU containing the additives at higher than (e.g. 5-10 times) their desired concentration levels according to this invention. The pellets of the master batch are then tumble blended with virgin PSU pellets and injection molded or extruded or otherwise melt fabricated into their final form. To incorporate the violet dye successfully into the Example 10 composition, a 10 ppm master batch blend was prepared first because that is much easier to prepare/control than a 2 ppm composition. Once the 10 ppm master batch sample was prepared, the amount of dye was reduced down to the level of Example 10 composition using 20% by weight master batch and the balance polysulfone and whatever was needed to complete the composition including PEPQ™. This approach ensured more homogeneous incorporation of the violet dye into the resin prior to injection molding. It is important that the resins with dusted stabilizer are dried thoroughly in a desiccated oven prior to injection molding. Injection molding procedures similar to those used for molding Examples C2-C7 and Examples 1-6 were used for molding Examples 7-12 and control C9. Control C10 was molded according to commonly known guidelines for injection molding polycarbonate resin.

Eastobrite OB-1 and OB-3™ optical brighteners improve the transmittance of the polysulfone compositions. The combination of PEPQ™ with ZIRS Oil Violet™ or Eastobrite OB-3™ causes an additional 5 unit reduction in the color factor (from 21 to 16) without any significant increase in haze.

While the color factors of Examples 10 and 12 are about the same, the light transmittance profiles are different. This can be seen in FIG. 5 where the transmittance curves of Control C9 and Examples 7, 10, and 12 are overlaid. The individual light transmittance values are recorded in Table 12.

TABLE 12

Light transmittance (%) of Control C9 and Examples 7, 10 and 12 at different wavelengths.

| Wavelength (nm) | Examples | | | |
|---|---|---|---|---|
| | C9 | 7 | 10 | 12 |
| 400 | 73.9 | 78.3 | 77.6 | 11.4 |
| 420 | 78.4 | 81.9 | 81.5 | 74.3 |
| 440 | 81.7 | 84.2 | 83.8 | 87.0 |
| 460 | 84.3 | 85.9 | 85.2 | 87.2 |
| 480 | 85.2 | 86.7 | 86.0 | 87.6 |
| 500 | 86.2 | 87.4 | 86.3 | 87.8 |
| 520 | 86.7 | 87.8 | 86.6 | 87.9 |
| 540 | 87.3 | 88.2 | 86.7 | 88.2 |
| 560 | 87.9 | 88.5 | 86.7 | 88.3 |
| 580 | 88.1 | 88.7 | 86.7 | 88.3 |
| 600 | 88.1 | 88.7 | 87.0 | 88.4 |
| 620 | 88.6 | 89.0 | 87.4 | 88.5 |
| 640 | 88.6 | 89.0 | 87.9 | 88.7 |
| 660 | 88.6 | 89.0 | 88.4 | 89.0 |
| 680 | 88.8 | 89.1 | 88.6 | 89.1 |
| 700 | 88.7 | 89.1 | 88.9 | 89.2 |

$VR_{40}$ melt stability tests were run to determine to what extent the melt stability of the polysulfone may be jeopardized by the addition of additives employed. The results of the $VR_{40}$ melt stability tests were all favorable, as can be seen in Table 11, with very little viscosity change over the 40-minute test duration at 410° C.

The experiments show that:
1. Stabilization of polysulfone against color development during melt fabrication is important to the development of optical quality polysulfone.
2. The phosphite/phosphonite mixture, PEPQ™, inhibits thermally induced color development in polysulfone. To achieve the color stabilization function without affecting resin haze, melt stability or other properties, a loading level of PEPQ™ of about 0.075% by weight (750 ppm) is quite effective. Color factors are typically reduced by 30-35% in the presence of PEPQ™ relative to an unmodified resin.
3. The use of a violet dye (ZIRS Oil Violet™) at about 2 ppm was found beneficial in reducing color factor further without jeopardizing light transmittance, haze or other attributes. With the ZIRS dye present, a color factor of 16 was achieved along with light transmittance values >85% as compared to a CF of 21 when only PEPQ™ was added.

Use of an optical brightener, Eastobrite OB-3™, was also found effective in reversing resin yellowness and producing a similar neutralization of the resin's residual yellow cast. A color factor of 16 was also achieved using the combination of PEPQ™ at 750 ppm with OB-3 at 25 ppm. The PEPQ™, ZIRS dye and OB-3™ can all be used together as a ternary combination, to synergistically reduce the levels required of each of the ZIRS and OB-3 additives. While counteracting yellowness, it was found that the Eastobrite OB-3™ optical brightener boosts the transmittance by about 2% in the 440-700 nm wavelength range but causes absorption in the 400-440 nm range.

In addition to the additives required for the practice of this invention, other additives can be incorporated to achieve other targeted performance or processing attributes. These can include but are not limited to: lubricants, mold releases, antistatic agents, UV absorbers, flame retardants, anti-fogging agents and matting agents.

Control C11 Comparative Example C12 and Example 13

The following examples illustrate the practice of this invention showing how the incorporation of an organic phosphorous-containing melt stabilizer along with a trace amount of blue to violet dye during the melt fabrication of the material can result in a polysulfone that meets the yellowness index requirements of less than 2.0, or, depending on specimen thickness, less than 1.0, less than 0.5 and even less than 0.25. These yellowness index values are achieved while maintaining acceptably high light transmittance values (>85%) and haze values which are also acceptable and less than 2.0%

A sample of commercially available UDEL® P-3703 NT polysulfone resin was taken from a commercial lot and dried for 3 hours in a desiccated oven at 150° C. and then injection molded on an 75 ton Arburg injection molding machine using typical molding conditions for this material into color plaques of four different thicknesses. Plaques of four different thicknesses were molded: 0.05, 0.10, 0.125 and 0.20 inches. This sample represents control C11. The sample exhibited a color factor of 47 when measured on 0.1" thick molded plaques. Yellowness index was measured per ASTM method D1925 and the light transmittance and haze values were measured per ASTM method D1003 at each of the thicknesses. The data are summarized in Tables 13-15.

During the production of the above grade of UDEL® P-3703 NT resin described above, the Sandostab PEPQ™ was added to a portion of the resin in a chlorobenzene/polysulfone solution in the proportion of 0.075% based on polymer weight in the solution. The polymer solution was then concentrated in a forced circulation evaporator to remove part of the chlorobenzene solvent, then completely devolatilized into pellets using a vacuum-vented twin-screw extruder. This sample represents comparative example C12. The pellets thus obtained were dried and injection molded as described for Control C11 above to produce color plaques at the four different thicknesses referred to under C11. The color factor was measured on 0.1" thick plaques and a color factor of 24 was recorded, which represents an almost 50% reduction relative to the control. The yellowness index, light transmittance and haze were measured at all four thicknesses and the values are reported in Tables 13-15.

A sample of the UDEL® P-3703 NT polysulfone resin used to produce Control C11 was tumble-blended with 0.075% Sandostab PEPQ™ and 1.6 ppm of Calco Oil Violet ZIRS™ dye commercially available from BASF. The resulting mixture was dried and injection molded, as described, to produce color plaques of four different thicknesses as explained under Control C11. This sample represents Example 13. The color factor of this composition, as measured on the 0.1" thick plaques, was remarkably found to be 11. This is more than a four-fold reduction relative to the control. The full set of yellowness index, light transmittance and haze data for this example are also shown in Tables 13-15.

As evident from the data presented in Table 13, the yellowness index of the resin can be reduced substantially through the use of the instant invention. The yellowness index is reduced by approximately a factor of two in going from the control case to the case of comparative example C12, and a three to four fold reduction in yellowness index is achieved with the practice of the invention as illustrated in Example 13. The reduction in yellowness index is achieved without any significant loss in light transmittance and without any increase in haze levels, as shown in Tables 13-15. As such, all three aspects of a good optical quality material: low yellowness index, high light transmittance and low haze are achieved simultaneously.

Figure 6:
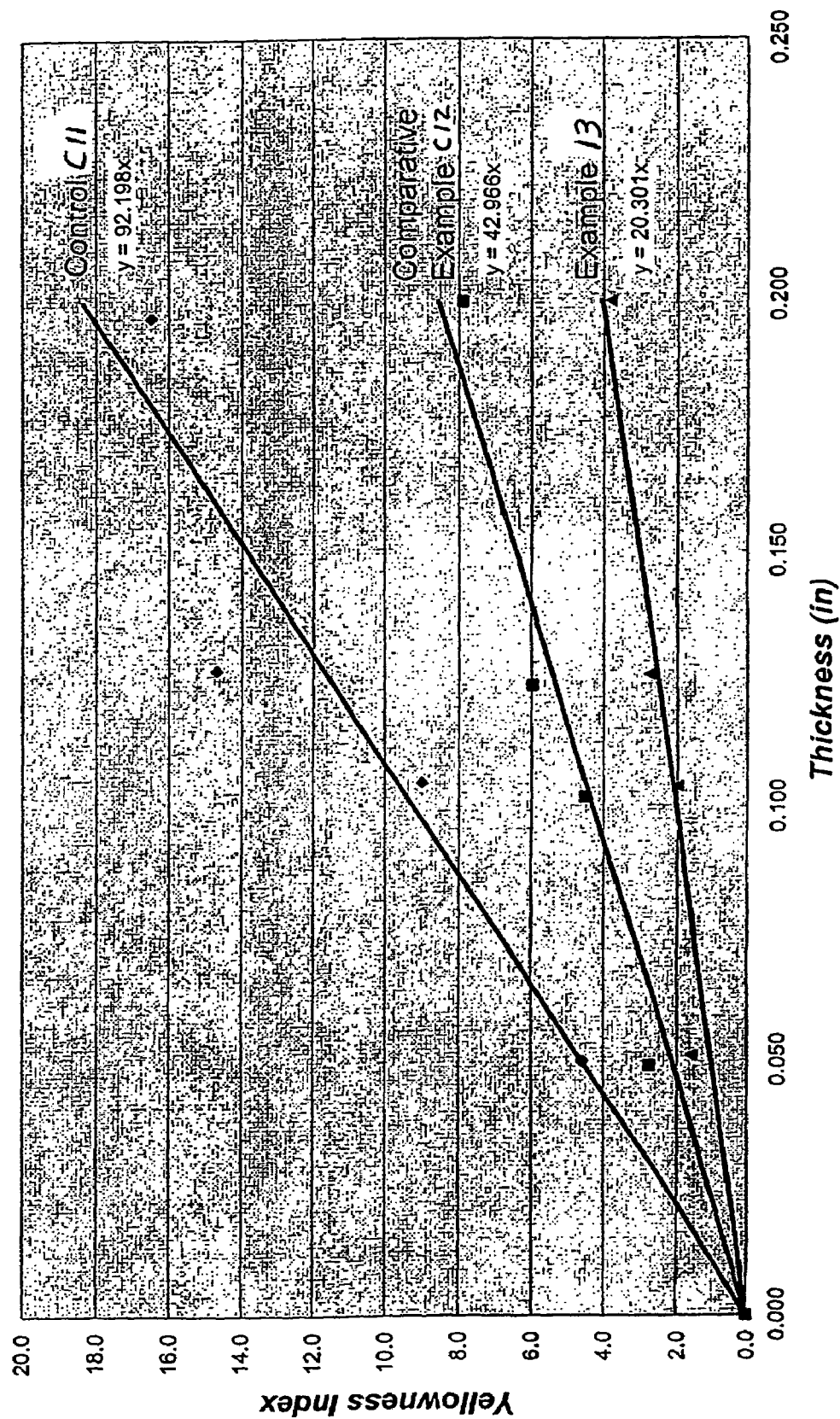
FIG. 6 graphically illustrates the dependence of Yellowness Index on sample plaque thickness.

To illustrate the dependence of yellowness index on part thickness, the yellowness index (YI) data from control C11, comparative example C12 and Example 13 are plotted as a function of thickness in FIG. 6. The YI data falling at the origin of the plot is also considered to be a requirement and a constraint on the YI-thickness correlation due to the removal of all color absorbing quality in the materials at the limit of vanishing thicknesses. The YI data plotted in FIG. 6 show that the YI is related to thickness by a simple straight line relationship. The straight line equations going through the origin for each of the three cases illustrated are listed on the graph in FIG. 6. From these straight line proportionality relationships, interpolated estimates for the thicknesses corresponding to any given YI can be calculated.

The interpolated values of thickness at selected YI levels of interest are shown in Table 16. This table clearly shows the advantage of the material produced in Example 13 over those of C11 and C12 in terms of the minimum thickness that is required to achieve a specified YI value.

TABLE 13

Yellowness index of Control C11, Comparative Example C12 and Example 13.

| Thickness (in) | Yellowness Index | | |
|---|---|---|---|
| | C11 | C12 | 13 |
| 0.05 | 4.6 | 2.8 | 1.6 |
| 0.10 | 9.0 | 4.5 | 2.0 |
| 0.125 | 14.7 | 6.0 | 2.8 |
| 0.20 | 16.5 | 7.9 | 3.8 |

TABLE 14

Light transmittance of Control C11, Comparative Example C12 and Example 13.

| | Light Transmittance (%) | | |
|---|---|---|---|
| Thickness (in) | C11 | C12 | 13 |
| 0.05 | 88.1 | 88.7 | 87.9 |
| 0.10 | 86.3 | 88.2 | 86.1 |
| 0.125 | 85.8 | 87.9 | 85.6 |
| 0.20 | 83.4 | 87.2 | 83.4 |

TABLE 15

Haze of Control C11, Comparative Example C12 and Example 13.

| | Haze (%) | | |
|---|---|---|---|
| Thickness (in) | C11 | C12 | 13 |
| 0.05 | 1.0 | 0.9 | 1.0 |
| 0.10 | 1.8 | 1.6 | 1.7 |
| 0.125 | 3.9 | 1.5 | 1.8 |
| 0.20 | 2.5 | 2.3 | 2.7 |

TABLE 16

Selected interpolated yellowness index values for Control C11, Comparative Example C12 and Example 13 corresponding to various thicknesses

| | Thickness (in) | | |
|---|---|---|---|
| Yellowness Index | C11 | C12 | 13 |
| 2.00 | 0.022 | 0.047 | 0.099 |
| 1.00 | 0.011 | 0.023 | 0.049 |
| 0.50 | 0.005 | 0.012 | 0.025 |
| 0.25 | 0.003 | 0.006 | 0.012 |

As shown in FIG. 6, the yellowness index is linearly related to the thickness of the molded article. As shown in Table 16, transparent, molded polysulfone articles with yellowness indices less than 1.00, 0.75, and 0.50 are included within the scope of this invention. Certain embodiments of the present invention also include molded optical components, such as ophthalmic lenses, with yellowness indices less than 1.00, 0.75, and 0.50. In addition, transparent layers of polysulfone having yellowness indices less than 1.00, 0.75, and 0.50 are included within the scope of this invention. Furthermore, molded polysulfone articles with color factors less than 5, 4, and 3 are included within the scope of this invention. Certain embodiments of the present invention also include molded optical components, such as ophthalmic lenses, with color factors less than 5, 4 and 3. In addition, transparent layers of polysulfone having color factors less than 5, 4, and 3 are included within the scope of this invention.

To improve the properties of the molded polysulfone articles high purity polysulfone is desirable. The use of high purity monomers is beneficial to forming high purity polymers. Polysulfone is conventionally formed by reacting 2,2-bis(4-hydroxyphenyl)propane (also known as bisphenol A) with at least one diarylsulfone compound. Polycarbonate grade bisphenol A is a high purity grade of bisphenol A and is commercially available from several manufacturers. Polycarbonate grade bisphenol A is used to make polysulfone and optical quality polycarbonate. Commercially available polycarbonate grade bisphenol A typically comprises trace amounts isomeric impurities, such as 2-(4-hydroxyphenyl)-2-(2-hydroxyphenyl)propane (the ortho/para isomer) and 2,2-bis(2-hydroxyphenyl)propane (the ortho/ortho isomer). Commercially available polycarbonate grade bisphenol A typically contains less than 0.27% by total weight of the ortho/para and ortho/ortho isomers. Typically, commercially available polycarbonate grade bisphenol A, contains less than 0.15% by total weight of the ortho/para and ortho/ortho isomers. Furthermore, polycarbonate grade bisphenol A that contains less than 200 ppm of the ortho/para and ortho/ortho isomers is commercially available.

The embodiments illustrated in the instant disclosure are for illustrative purposes. They should not be construed to limit the scope of the claims. Though ophthalmic lenses and compositions suitable for forming ophthalmic lenses are explicitly disclosed herein, a wide variety of optical components are within the scope of this invention. Optical components within the scope of this invention include non-ophthalmic lenses, prisms, waveguides, optical fibers, lighting fixtures, and electronic devices. As is clear to one of ordinary skill in this art, the instant disclosure encompasses a wide variety of embodiments not specifically illustrated herein.

What is claimed is:

1. A composition comprising:
a polysulfone;
an organic phosphorous-comprising melt stabilizer;
a blue to violet dye; and
optionally an organic optical brightener.

2. The composition according to claim 1, wherein the polysulfone is bisphenol A polysulfone represented by the following structure:

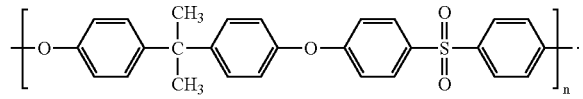

3. The composition according to claim 1, wherein the polysulfone is a copolymer comprising at least 75 mole % bisphenol A and up to 25 mole % of another bisphenol selected from the group consisting of bisphenol S, bisphenol O, biphenol, and hydroquinone.

4. The polysulfone composition according to claim 1, wherein the composition comprises the organic optical brightener.

5. The polysulfone composition according to claim 1, wherein the composition comprises from 30 ppm to 3000 ppm by weight of the organic phosphorous-comprising melt stabilizer selected from the group consisting of phosphites, phosphonites, and mixtures thereof.

6. The composition according to claim 5, wherein the composition comprises from 0.5 to 500 ppm of the organic optical brightener.

7. The composition according to claim 6, wherein the composition comprises from 0.1 to 100 ppm of the blue to violet dye.

8. The composition according to claim 5, wherein the composition comprises from 0.1 to 100 ppm of the blue to violet dye.

9. The composition according to claim 5, wherein the organic phosphorous-comprising melt stabilizer comprises a phosphite comprising a pentaerythritol moiety.

10. The composition according to claim 5, wherein the organic phosphorous-comprising melt stabilizer comprises a dialkyl substituted aromatic phosphite.

11. The composition according to claim 5, wherein the organic phosphorous-comprising melt stabilizer comprises an aromatic phosphonite.

12. The composition according to claim 11, wherein the composition comprises form 0.5 to 500 ppm of the organic optical brightener.

13. The composition according to claim 12, wherein the composition comprises from 0.1 to 100 ppm of the blue to violet dye.

14. The composition according to claim 11, wherein the composition comprises from 0.1 to 100 ppm of the blue to violet dye.

15. The composition according to claim 11, wherein the organic phosphorous-comprising melt stabilizer further comprises an aromatic phosphite.

16. The composition according to claim 5, wherein the composition further comprises 5,7-di-t-butyl-3-(3,4 di-methylphenyl)-3H-benofuran-2-one.

17. The composition according to claim 1, wherein the composition has a total luminous light transmittance of 84% or greater when measured on 0.1 inch thick specimens using ASTM D-1003 and also satisfy at least one of the following two conditions:
1) a yellowness index (YI) of less than about 5.0 as measured according to ASTM D-1925 on 0.1 inch thick specimens, or
2) a color factor (CF) of less than about 25, wherein CF is defined by the following equation:

$CF=270[(x+y)_{sample}-(x+y)_{air}]/t$ wherein x and y are chromaticity coordinates measured in transmittance mode and t is sample thickness in inches.

18. An article comprising the composition according to claim 1, wherein the article is melt fabricated.

19. An article comprising the composition according to claim 1, wherein the article is injection molded or compression molded.

20. An article comprising the composition according to claim 1, wherein the article is hybrid injection-compression molded.

21. An article comprising the composition according to claim 1, wherein the article is extruded.

22. An article comprising the composition according to claim 1, wherein the article is blow-molded.

23. An article comprising the composition according to claim 1, wherein the article is thermoformed.

24. A composition comprising:
a polysulfone;
an organic phosphorous-comprising melt stabilizer; and
a bisbenzoxazole optical brightener.

25. The composition according to claim 24, wherein the bisbenzoxazole optical brightener is 2,2'-(1,2-Ethenediyldi-4,1-phenylene)bisbenzoxazole.

26. The composition according to claim 25, wherein the polysulfone is bisphenol A polysulfone represented by the following structure:

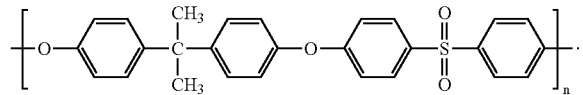

27. A composition comprising:
a polysulfone; and
a bisbenzoxazole optical brightener.

28. The composition according to claim 27, wherein the bisbenzoxazole optical brightener is 2,2'-(1,2-Ethenediyldi-4,1-phenylene)bisbenzoxazole.

29. The composition according to claim 28, wherein the polysulfone is bisphenol A polysulfone represented by the following structure:

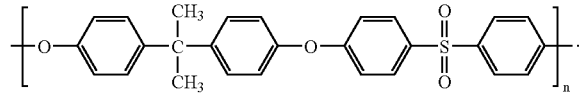

* * * * *